United States Patent [19]

Rose et al.

[11] Patent Number: 5,845,318
[45] Date of Patent: Dec. 1, 1998

[54] DASD I/O CACHING METHOD AND APPLICATION INCLUDING REPLACEMENT POLICY MINIMIZING DATA RETRIEVAL AND STORAGE COSTS

[75] Inventors: Robert Allen Rose, Round Rock, Tex.; Joseph Harry Nord, Lighthouse Point, Fla.

[73] Assignee: International Business Machines Corporation, Armonk, N.Y.

[21] Appl. No.: 738,851

[22] Filed: Oct. 28, 1996

[51] Int. Cl.[6] ............................................. G06F 12/00
[52] U.S. Cl. .......................... 711/113; 711/3; 711/112; 711/154
[58] Field of Search ............................ 711/3, 112, 113, 711/118, 154

[56] References Cited

U.S. PATENT DOCUMENTS

| | | | |
|---|---|---|---|
| 4,489,378 | 12/1984 | Dixon et al. | 364/200 |
| 4,490,782 | 12/1984 | Dixon et al. | 364/200 |
| 4,916,605 | 4/1990 | Beardsley et al. | 364/200 |
| 4,956,803 | 9/1990 | Tayler et al. | 364/900 |
| 4,972,316 | 11/1990 | Dixon et al. | 364/200 |
| 5,014,197 | 5/1991 | Wolf | 364/200 |
| 5,136,692 | 8/1992 | Barrett et al. | 395/250 |
| 5,142,670 | 8/1992 | Stone | 395/425 |
| 5,220,653 | 6/1993 | Miro | 395/275 |
| 5,329,622 | 7/1994 | Belsan | 711/113 |
| 5,590,379 | 12/1996 | Hassler et al. | 711/113 |
| 5,630,002 | 5/1997 | Hashimoto | 711/113 |
| 5,636,355 | 6/1997 | Ramakrishnan et al. | 711/113 |

*Primary Examiner*—Tod R. Swann
*Assistant Examiner*—Tuan V. Thai
*Attorney, Agent, or Firm*—Jeffrey S. LaBaw; Daniel E. Venglarik; Andrew J. Dillon

[57] ABSTRACT

The performance of a DASD having a data cache and at least one set of R/W heads is improved by implementing a replacement policy which, upon determining that a request for data in the DASD requires replacement of a data in a data cache buffer, selects cache data corresponding to data which is cheapest to retrieve from the DASD in view of a location of the DASD R/W heads and replaces the selected cache data with the requested data, thus keeping the cache filled with data which is least expensive to retrieve from the DASD. Data in the DASD is updated from the cache when it is inexpensive.

20 Claims, 5 Drawing Sheets

DASD I/O CACHING METHOD AND APPLICATION INCLUDING REPLACEMENT POLICY MINIMIZING DATA RETRIEVAL AND STORAGE COSTS

BACKGROUND OF THE INVENTION

1. Technical Field

The present invention relates in general to a method and system for improving performance of a DASD in a data processing system, and in particular to a method and system for improving performance of a DASD in a data processing system by increasing the value data cached by the DASD. Still more particularly, the present invention relates to a method and system for improving performance of a DASD in a data processing system by implementing a cache replacement policy which replaces cache data determined to be cheapest to retrieve from the DASD given the location of the DASD's R/W heads and updates data on a DASD from the cache when it is inexpensive in terms of data access time or costs.

2. Description of the Related Art

It is well known to utilize fixed or hard disk drives to store information for processing in a processing unit connected to a main memory. Information is stored on disks according to a predetermined pattern of cylinders and sectors, each sector containing a predetermined number of bytes. A drive includes plural heads, there being one head for each side of a disk on which data is stored. Data is read from a disk one sector at a time. In order to access a desired sector, a head must first be moved to the cylinder containing the desired sector, the disk rotated past the head until the desired sector is reached, and then the sector is read and the contents placed in a buffer. In looking at the total amount of time required to access data on a disk, the principal delay occurs during the physical movement of a head. Thus, when processing involves a large amount of I/O activity, it is highly desirable to reduce the degree of head movement as much as possible to achieve improved performance.

The past several years have seen the growth of on-line workstations, the evolution of distributed processing, and the acceleration of information technology in many new application areas. The result has been an increase in the rate of access and the utilization of on-line database systems and a growth in the requirement for storage capacity and increased reliability and flexibility in data storage devices.

To satisfy the performance demands of on-line systems, the main memory of a central processing unit (CPU) and the DASD are supplemented with a directory managed, high speed buffer or cache (also memory) storage that is continually updated to contain recently accessed contents of the main memory of the CPU. The purpose of the cache is to reduce access time associated with obtaining information from slower speed DASD by having the information in the high speed cache.

The performance of the cache is characterized by hit/miss ratios. A hit occurs when a READ request from the CPU finds the requested data in cache, as contrasted with a miss which means the data is not in the cache and must be read from DASD. A hit with respect to a WRITE request from the CPU occurs when the information can be written to a free location in the cache for later transfer to the DASD. If there is no additional space available in the cache then a WRITE miss occurs and data must be written to DASD in order to accommodate the new information.

The process of writing information from cache to DASD is called destaging, and the process of reading information from DASD is called staging. Data destaged or staged between the cache and the DASD is conventionally managed by algorithms designed to keep the data most likely to be referenced next by the CPU in the cache. The CPU, of course, receives the commands for such activities from the user applications or operating system. Historically, cache algorithms have sought to keep frequently utilized data in the cache by incorporating some variety of aging scheme so that the cache is filled with recently utilized data. This scheme relies upon the assumption that data recently accessed will be accessed again. Two of the more popular algorithms that are utilized for this management are the least recently used (LRU) and the most recently used (MRU) algorithms. The LRU algorithm is utilized to determine which information in cache has been used the least and is a good candidate for destaging. The MRU algorithm is used to determine the information that is used the most and is a good candidate to be staged. These schemes rely on the assumption that data recently accessed will be accessed again. A problem occurs if the working set of data is larger than the cache. Under those circumstances, the locality principal is no longer sufficient to ensure an effective cache.

In view of the limitations of existing methods described above, it would be desirable to have a DASD cache system which keeps the cache filled with data which is the most expensive, in terms of seek time, to retrieve from the DASD.

SUMMARY OF THE INVENTION

It is therefore one object of the present invention to provide a method and system for improving performance of a DASD in a data processing system.

It is another object of the present invention to provide a method and system for improving performance of a DASD in a data processing system by increasing the value data cached by the DASD.

It is yet another object of the present invention to provide a method and system for improving performance of a DASD in a data processing system by implementing a cache replacement policy which replaces cache data determined to be cheapest to retrieve from the DASD given the location of the DASD's R/W heads and updates data on a DASD from the cache when it is inexpensive in terms of data access time or costs.

The foregoing objects are achieved as is now described. The performance of a DASD having a data cache and at least one set of R/W heads is improved by implementing a replacement policy which, upon determining that a request for data in the DASD requires replacement of a data in a data cache buffer, selects cache data corresponding to data which is cheapest to retrieve from the DASD in view of a location of the DASD R/W heads and replaces the selected cache data with the requested data, thus keeping the cache filled with data which is least expensive to retrieve from the DASD. Data in the DASD is updated from the cache when it is inexpensive.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
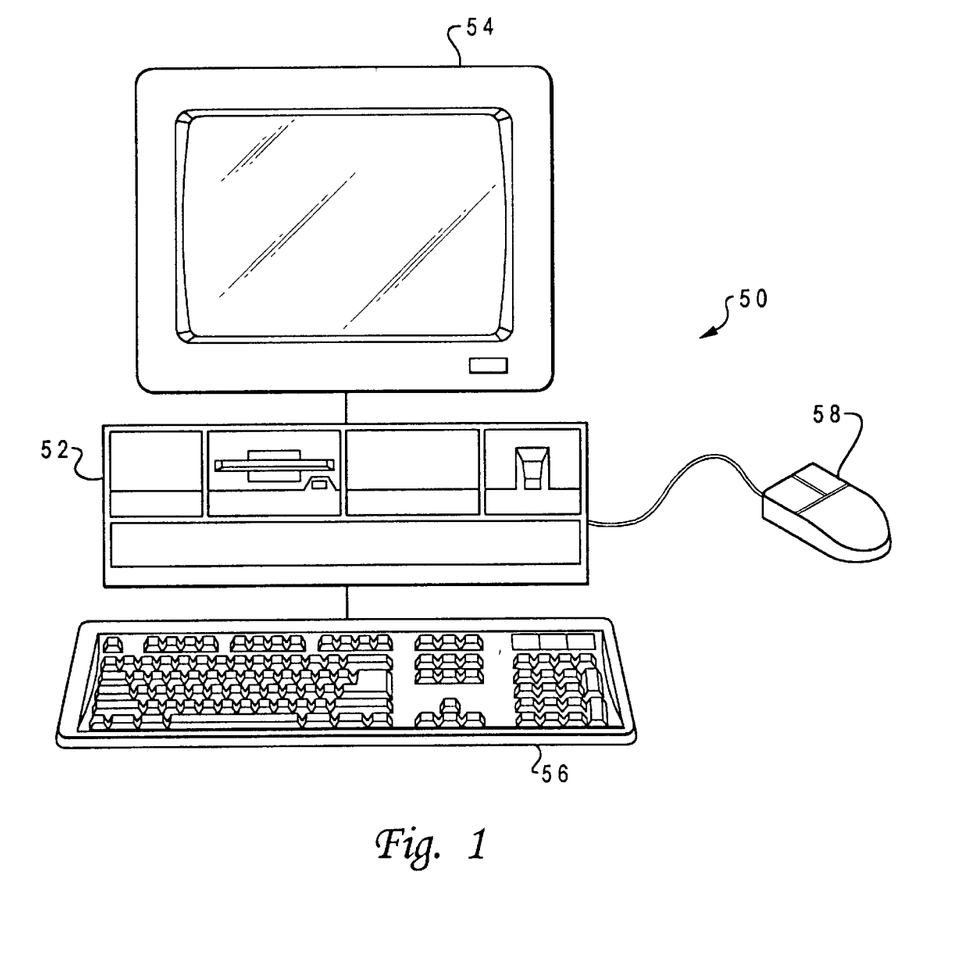
FIG. 1 is a pictorial representation of a personal computer that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PC computer, a product of International Business Machines Corporation, located in Armonk, N.Y. Although the depicted embodiment involves a personal computer, a preferred embodiment of the present invention may be implemented in other types of data processing systems, such as for example, intelligent work stations or minicomputers.

Figure 2:
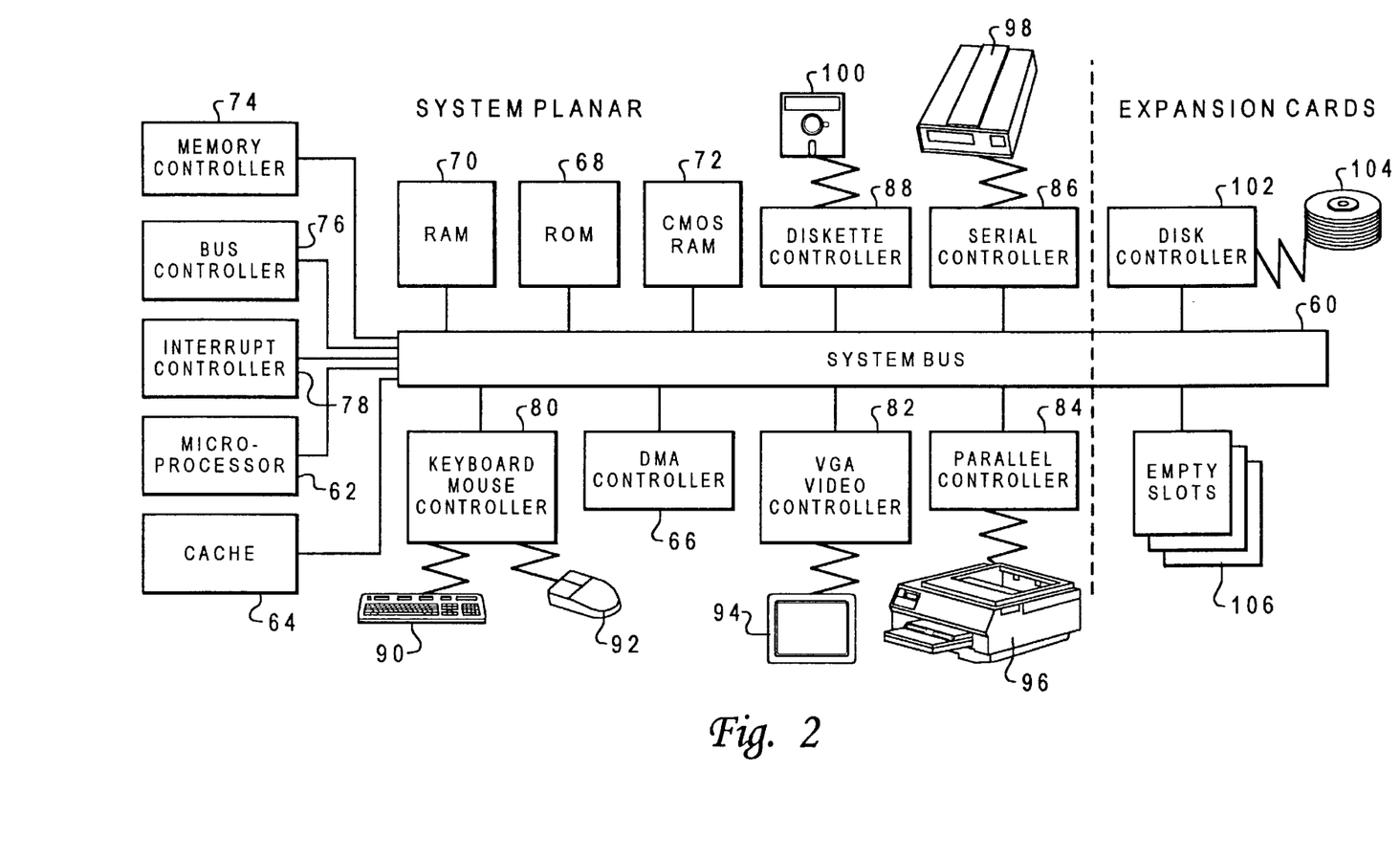
FIG. 2 depicts a block diagram of selected components in the personal computer represented in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60, as is cache 64. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk drive, an audio adapter, high resolution graphics adapter, and the like also may be utilized in addition to or in place of the hardware already depicted to enable personal computer 50 to present multimedia presentations to a user.

It is difficult to place a valuation scheme on cached data corresponding to data on DASD 104. However, if time spent in retrieving data from the DASD is the real consideration, the real value $V_t$ of cached data is equal to the time it takes to read data from disk ($T_{DASD}$) minus the time it takes to look up the same data in cache ($T_{CACHE}$), or stated mathematically:

$$V_t = T_{DASD} - T_{CACHE} \quad (1)$$

Clearly, in view of this relationship, if the DASD speed $T_{DASD}$ is the same as the cache speed $T_{CACHE}$, the cache is of no value.

It may be assumed that if the processor 62 calls for data located in cache 64, the speed—or cost in time or power—of reading that data from cache 64 will always be the same. However the same is not true of the cost of I/O (input/output) from DASD 104. With DASD I/O, the value or temporal cost of bringing the data into the processor 62 will depend upon three main factors: (1) seek latency, or the amount of time required to seek the data on the disk; (2) rotational latency, or the amount of time required to bring the disk up to speed to obtain a proper read, and (3) data transfer time. Nothing in software can be done to affect transfer time. Similarly, there is virtually nothing which can be done to improve rotational latency. Therefore, seek latency is the prime consumer of time which can be improved.

In accordance with the present invention, the replacement policy imposed on cache 64 seeks to keep cache 64 filled with the most valuable data, i.e.—the data which costs the most in terms of time or power to retrieve from DASD 104 given the current location of the DASD's R/W heads. It is important to note that the area of cheapest cost, that around the heads, constantly moves back and forth over the surface of the DASD storage media. Thus, while future areas of cheapest cost cannot be predicted, a replacement policy for cached data may be implemented which assigns values to the buffers containing cached data and replaces data which is cheapest to retrieve from DASD 104.

In identifying which cache buffers contain data cheapest to retrieve from DASD 104, the cache buffers may be characterized as either "clean" (containing data unchanged since read from the DASD) or "dirty" (containing data which has been changed). Cache buffers may also be characterized as "near" (containing data corresponding to data on the DASD which is close to the requested data) or "far" (containing data corresponding to data on the DASD 104 which is distant from the requested data).

Figure 3:
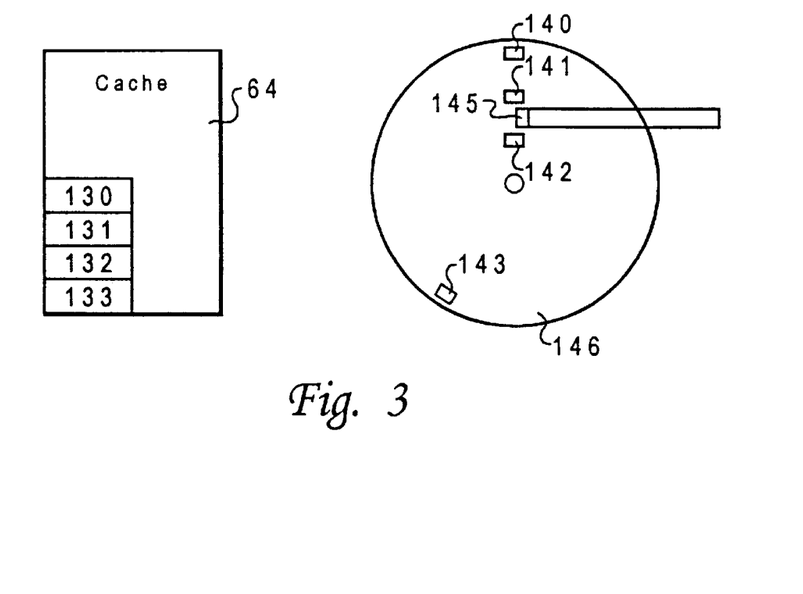
FIG. 3 depicts a plurality of cache buffers and the location of corresponding data on the DASD with respect to the DASD R/W heads in accordance with a preferred embodiment of the present invention.

Referring to FIG. 3, the characterization of specific cache buffers as "near" or "far" is illustrated. Cache 64 contains a plurality of buffers 130, 131, 132, and 133 containing data corresponding respectively to data 140, 141, 142, and 143 on DASD storage media 146. A READ or WRITE request for data on the DASD will cause DASD R/W heads 145 to have a particular location with respect to data on DASD storage media 146 as shown. Cache buffer 130 contains data corresponding to data 140 on DASD storage media 146 which is further from R/W heads 145 than data 141 or 142, which corresponds to data contained in cache buffers 131 and 132 respectively. Therefore cache buffer 130 would be characterized as "far," while cache buffers 131 and 132 would be characterized as "near."

For the purposes of illustrating the "near" and "far" characterizations, data 140, 141, and 142 are shown in FIG. 3 as being radially in-line with the R/W heads 145. However, it will be appreciated by those skilled in the art that a cache buffer 133 may contain data corresponding to data 143 anywhere on DASD storage media 146.

In selecting a buffer to overwrite with the requested data, near buffers are preferred to far buffers by the replacement policy of the present invention. The replacement policy similarly prefers clean buffers over dirty buffers, which require an I/O to clean so that data changes are not lost. The replacement policy of the cache assigns values to the buffers as follows (in increasing "costs"):

1. Near clean buffers
2. Far clean buffers
3. Near dirty buffers
4. Far dirty buffers Thus, if a buffer needs to be freed for new I/O, a clean buffer which is "cheap" will be selected on the assumption that if the data is needed again, it will be quick to read. Far clean buffers are preferred to near dirty buffers because, although the near dirty buffers should be quick to write out, an I/O is still required to clean the buffer. Far dirty buffers are avoided as much as possible because a long seek is required to clean the buffer and another long seek required to read the requested data from the DASD. If, for example, cache buffers 141 and 143 in FIG. 3 were flagged "dirty," the replacement policy would overwrite data in buffer 132 first. Buffer 130 would be preferred to buffer 131, since an I/O is required to update data 141 on DASD storage media 146 in order to "clean" buffer 131. If necessary, buffer 133—which is both "far" and "dirty"—would be the last cache buffer to be overwritten under the replacement policy of the present invention.

In addition to assigning values to buffers based on cost of retrieving the corresponding data from DASD storage media 146, an LRU policy may be implemented on top of the replacement policy described above so that the oldest near clean buffer is preferred to the newest near clean buffer and so forth.

Figure 4:
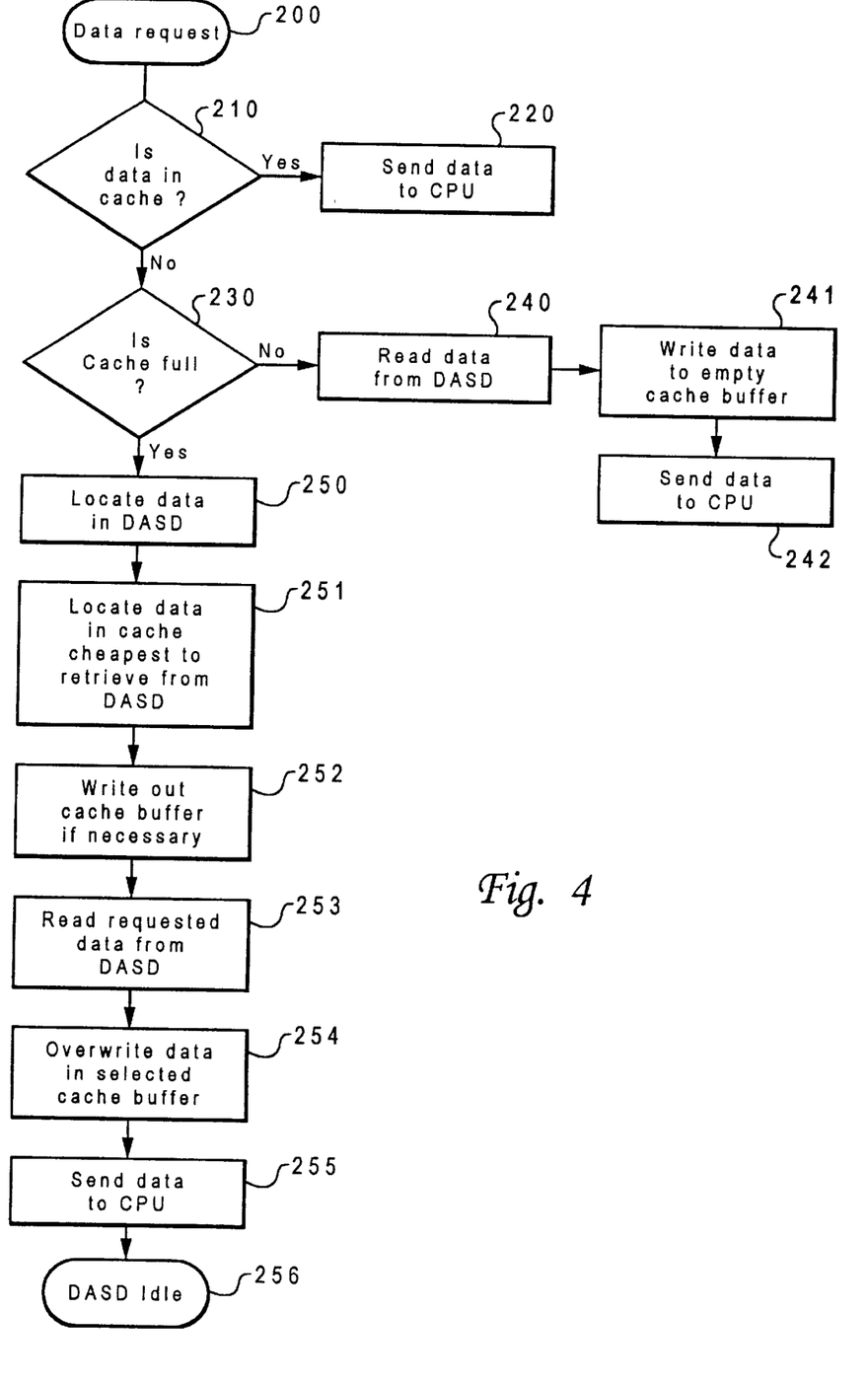
FIG. 4 is high level flow chart of a process employed to respond to a data READ request to the DASD in accordance with a preferred embodiment of the present invention.

Referring to FIG. 4, a high level flow chart of a process for responding to a READ request is depicted. The process begins in step 200 and proceeds to step 210. Step 210 depicts a determination of whether the data requested is already cached. Upon determination that the requested data is already cached, the process proceeds to step 220. Step 220 illustrates the passing of the requested data from the cache to the processor. Referring back to step 210, upon determination that the requested data is not already cached, the process proceeds to step 230, which depicts a determination of whether the cache is full. Upon determining that the cache is not full, the process proceeds to step 240. Step 240 illustrates the reading of the requested data from the DASD. The process next passes to step 241, which depicts storing the requested data in an empty cache buffer, and then to step 242, which illustrates sending the requested data to the processor.

With reference once again to step 230, upon determining that the cache has no empty buffers the process proceeds to step 250. Step 250 depicts determining the location of the requested data on the DASD. The process then passes to step 251, which depicts an identification of the cache buffer containing data which is cheapest to retrieve from the DASD in view of the location of the DASD's R/W heads. Afterward, the process proceeds to step 252, which illustrates writing out the data in the identified cache buffer to the DASD, if necessary (i.e., if the buffer has been flagged "dirty"). The process then passes to step 253, which depicts reading the requested data from the DASD. The process next passes to step 254, which illustrates overwriting the data in the identified cache buffer with the requested data, and then to step 255, which depicts sending the data to the processor. At this point in the process, the READ request has been satisfied and the process becomes idle until further involvement is required.

Figure 5:
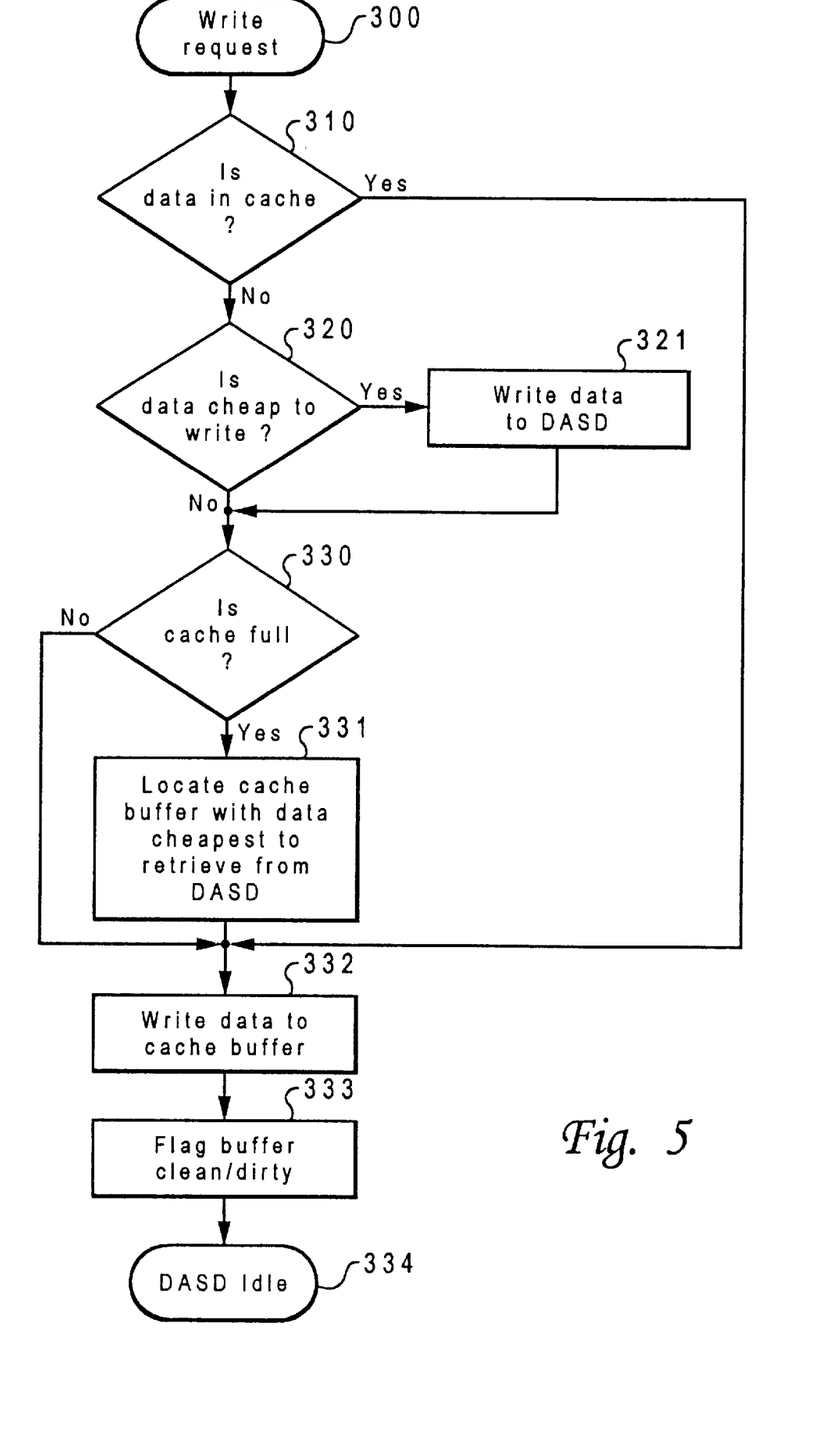
FIG. 5 depicts a high level flow chart of a process employed to respond to a data WRITE request in accordance with a preferred embodiment of the present invention.

With reference now to FIG. 5, a process that responds to WRITE request to the DASD using a hybrid of write-through and write-back cache policies and the replacement policy described above is illustrated by a high level flow chart. The process begins at step 300 and proceeds to step 310. Step 310 depicts a determination of whether the cache contains the data which is the subject of the WRITE request (i.e., the data to be updated). Upon determining that the requested data is already in the cache, the process proceeds to step 332, which illustrates writing the requested data to the appropriate cache buffer. The process then proceeds to step 333, which depicts flagging the appropriate cache buffer dirty. Under these circumstances, the WRITE request is satisfied and the process may become idle until further involvement is required.

Referring back to step 310, upon determining that the requested data is not in the cache, the process proceeds to step 320, which illustrates a determination of the cost of writing the block of data. If the block of data is determined to be cheap to write, the process passes to step 321, which illustrates writing the data to the DASD, and then proceeds to step 330. If the block of data is determined to be expensive to write, the actual I/O is deferred until later, when hopefully it will be cheaper, and the process proceeds directly to step 330.

Step 330 depicts a determination of whether the cache is full. Upon determining that the cache is not full, the process passes to step 332, which illustrates writing the data to an empty cache buffer. The process then passes to step 333, which depicts flagging the appropriate cache buffer clean or dirty depending on whether the data was written to the DASD in step 321. Under these circumstances, the WRITE request is satisfied and the process again may become idle until further involvement is required.

Referring back to step 330, if the cache is determined to be full, the process passes to step 331. Step 331 illustrates identification of the cache buffer containing data cheapest to retrieve from the DASD. The process next passes to step 332, which depicts writing the data to the identified cache buffer, and then to step 333, which depicts flagging the appropriate cache buffer clean or dirty depending on whether the data was written to the DASD in step 321. At this point in the process, the WRITE request is satisfied and the process becomes idle until further involvement is required.

Figure 6:
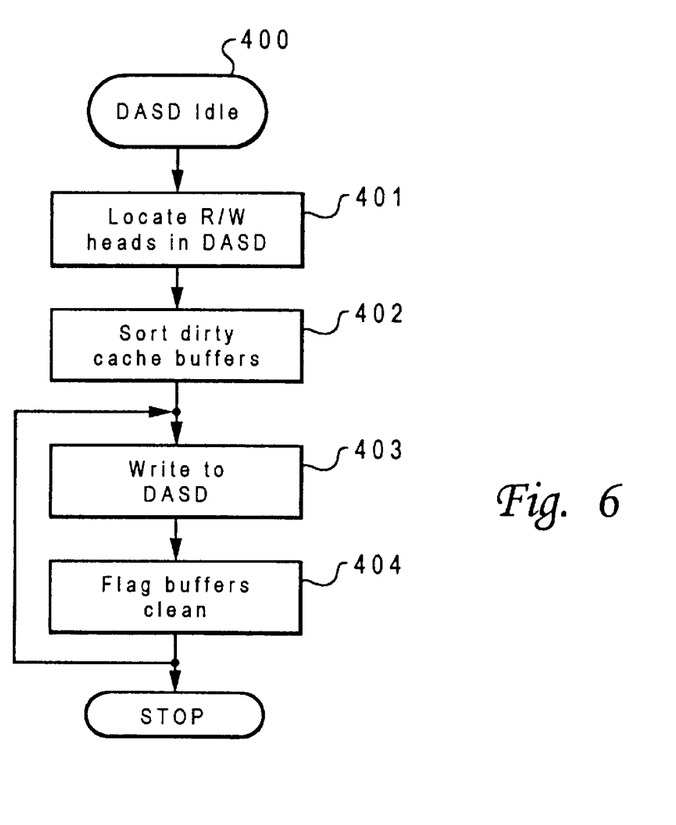
FIG. 6 is a high level flow chart of a process employed to update data on the DASD with changes stored in the cache in accordance with a preferred embodiment of the present invention.

Referring to FIG. 6, a process for updating the data in the DASD when the DASD becomes idle is illustrated in a high level flow chart. The process starts at step 400 and proceeds to step 401, which depicts locating the DASD R/W heads. The process then passes to step 402, which illustrates sorting the dirty cache buffers. Based on the location of the R/W heads, dirty buffers are sorted within two categories: those between the R/W heads and the nearest edge of the disk and those between the R/W heads and the furthest edge of the disk. The first category is sorted in order of proximity to the present location of the R/W heads and the second category is sorted in order of proximity to the furthest edge of the disk. The process then proceeds to step 403, which depicts writing out the dirty cache buffers to the DASD. The dirty cache buffers are written out in the sorted order as the R/W heads progress from their starting location toward the nearest edge of the disk. When the nearest edge of the disk is reached, the R/W heads are moved to the furthest edge of the disk and the remaining buffers are written out as the R/W heads progress back to their starting location. As depicted in step 404, the cache buffers are flagged clean as they are written out. Steps 403 and 404 are repeated as necessary to complete writing out all dirty buffers in the cache. Once complete, the process becomes idle until further updating of the DASD data becomes necessary and/or appropriate.

The present invention is described above in the context of a single set of movable R/W heads. Thus, the expense curve, or a plot of cost as a function of disk cylinder position, has only a single minimum. However, the method of the present invention can easily be scaled or extended to multiple arm DASD units. In such cases, the expense curve has multiple local minimums, each minimum corresponding to the position of an independent R/W arm.

When implemented as described, the method of the present invention reduces the number of DASD seeks over conventional LRU methods. One potential benefit of using the method of the present invention in laptop computers is extended battery life.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

We claim:

1. A method in a data processing system for improving performance of a DASD having a data cache and at least one set of R/W heads, comprising:

receiving a request for data in said DASD requiring replacement of data in a data cache buffer;

in response to receiving said request, selecting cache data corresponding to data which is cheapest to retrieve from said DASD in view of a location of said at least one set of R/W heads, wherein near clean data is selected over far clean data, far clean data is selected over near dirty data, and near dirty data is selected over far dirty data; and replacing said selected cache data with said requested data, wherein data within said cache selected for replacement is least expensive to retrieve from said DASD at the time of said request.

2. The method of claim 1 wherein said step of receiving a request for data in said DASD further comprises determining if said request requires data in a data cache buffer.

3. The method of claim 1 wherein said step of selecting cache data further comprises:

identifying said location of said at least one set of R/W heads; and selecting a cache buffer containing data corresponding to data located nearest in the DASD to said requested data.

4. The method of claim 3 wherein said step of selecting cache data further comprises writing out data in said selected cache buffer to said DASD.

5. The method of claim 1 wherein said step of selecting cache data further comprises:

identifying said location of said at least one set of R/W heads;

identifying a state of a cache buffer containing data corresponding to data located nearest in the DASD to said requested data; and selecting said cache buffer.

6. The method of claim 1 wherein said step of selecting cache data further comprises:

identifying said location of said at least one set of R/W heads;

identifying a state of a first cache buffer containing data corresponding to data located nearest in the DASD to said requested data;

identifying a state of a second cache buffer containing data corresponding to data located further in the DASD from said requested data than said data contained in said first cache buffer; and selecting said second cache buffer.

7. The method of claim 1 further comprising:

updating data in said DASD from said data cache.

8. The method of claim 7 wherein the step of updating data in said DASD further comprises:

sorting a first portion of data in said data cache corresponding to data in said DASD between said R/W heads and a nearest edge of said DASD by proximity to said RIW heads;

sorting a second portion of data in said data cache corresponding to data in said DASD between said R/W heads and a furthest edge of said DASD by proximity to said furthest edge;

writing said first portion of data in said data cache to said DASD while moving said R/W heads toward said nearest edge;

moving said R/W heads to said furthest edge; and writing said second portion of data in said data cache to said DASD while moving said R/W heads away from said furthest edge.

9. A data processing system for improving performance of a DASD having a data cache and at least one set of R/W heads, comprising:

means for receiving a request for data in said DASD requiring replacement of data in a data cache buffer;

means for selecting cache data corresponding to data which is cheapest to retrieve from said DASD in view of a location of said at least one set of R/W heads, wherein near clean data is selected over far clean data, far clean data is selected over near dirty data, and near dirty data is selected over far dirty data; and means for replacing said selected cache data with said requested data, wherein data within said cache selected for replacement is least expensive to retrieve from said DASD at the time of said request.

10. The data processing system of claim 9 wherein said means for determining that a request for data in said DASD requires replacement of data in a data cache buffer further comprises:

means for receiving a request for data in said DASD; and means for determining if said requested data is in a data cache buffer.

11. The data processing system of claim 9 wherein means for selecting cache data further comprises:

means for identifying said location of said R/W heads; and means for selecting a cache buffer containing data corresponding to data located nearest in said DASD to said requested data.

12. The data processing system of claim 11 wherein said means for selecting cache data further comprises means for writing out data in a selected cache buffer to said DASD.

13. The data processing system of claim 9 wherein said means for selecting cache data further comprises:

first identifying means for identifying said location of said at least one set of R/W heads;

second identifying means for identifying a state of a cache buffer containing data corresponding to data located nearest in the DASD to said requested data; and selection means for selecting said cache buffer.

14. The data processing system of claim 9 wherein said means for selecting cache data further comprises:

first identifying means for identifying said location of said at least one set of R/W heads;

second identifying means for identifying a state of a first cache buffer containing data corresponding to data located nearest in the DASD to said requested data;

third identifying means for identifying a state of a second cache buffer containing data corresponding to data located further in the DASD from said requested data than said data contained in said first cache buffer; and selection means for selecting said second cache buffer.

15. The data processing system of claim 9 further comprising:

means for updating data in said DASD.

16. The data processing system of claim 15 wherein the means for updating data in said DASD further comprises:

means for sorting a first portion of data in said data cache corresponding to data in said DASD between said R/W heads and a nearest edge of said DASD by proximity to said R/W heads;

means for sorting a second portion of data in said data cache corresponding to data in said DASD between said R/W heads and a furthest edge of said DASD by proximity to said furthest edge;

means for writing said first portion of data in said data cache to said DASD while moving said R/W heads toward said nearest edge;

means for moving said R/W heads to said furthest edge; and means for writing said second portion of data in said data cache to said DASD while moving said R/W heads away from said furthest edge.

17. A storage device readable by a data processing system and encoding executable instructions for the data processing system, comprising:

means for receiving a request for data in said DASD requiring replacement of data in a data cache buffer;

means for selecting cache data corresponding to data which is cheapest to retrieve from said DASD in view of a location of said at least one set of R/W heads, wherein near clean data is selected over far clean data, far clean data is selected over near dirty data, and near dirty data is selected over far dirty data; and means for replacing said selected cache data with said requested data, wherein data within said cache selected for replacement is least expensive to retrieve from said DASD at the time of said request.

18. The storage device of claim 17, wherein said storage device is a hard disk drive.

19. The storage device of claim 17, wherein said storage device is a ROM for use within said data processing system.

20. The storage device of claim 17, wherein said storage device is a floppy diskette.

* * * * *

UNITED STATES PATENT AND TRADEMARK OFFICE
CERTIFICATE OF CORRECTION

PATENT NO. : 5,845,318
DATED : December 1, 1998
INVENTOR(S) : Rose et al.

It is certified that error appears in the above-identified patent and that said Letters Patent is hereby corrected as shown below:

Column 8, line 52, please change "RIW" to --R/W--.

Signed and Sealed this

Twentieth Day of July, 1999

*Attest:*

Q. TODD DICKINSON

*Attesting Officer*     Acting Commissioner of Patents and Trademarks